Nov. 30, 1926.
R. A. KLINE
1,608,885
REMOVABLE BRAKE BAND
Filed Jan. 25, 1926
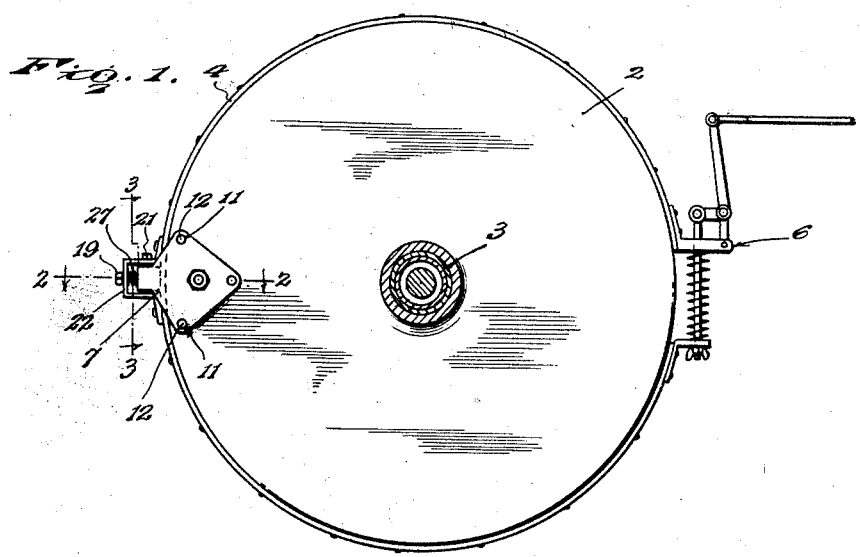
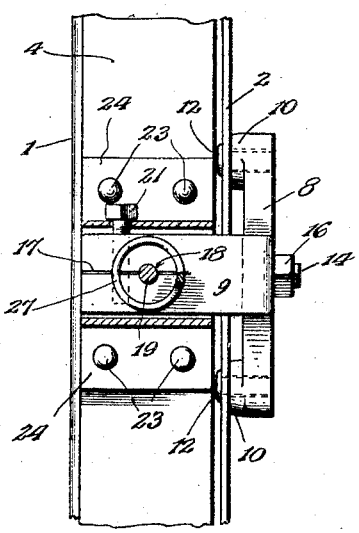
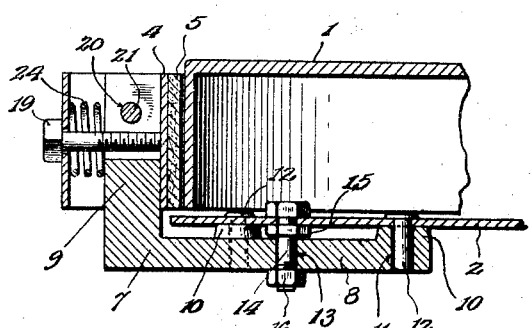
Inventor
R. A. Kline.

Patented Nov. 30, 1926.

1,608,385

UNITED STATES PATENT OFFICE.

ROY A. KLINE, OF NEW BERLIN, PENNSYLVANIA.

REMOVABLE BRAKE BAND.

Application filed January 25, 1926. Serial No. 83,642.

This invention relates to brake bands and more particularly to a mounting for the same.

One object of the invention is to so mount the brake band that it may be readily removed when relining the brake without the necessity of removing the vehicle wheel.

Another object of the invention is to provide the brake band with a mounting bracket so constructed that it may be secured to the dust guard of a brake drum by a single bolt and when so mounted will be prevented from tilting circumferentially of the bolt.

Another object of the invention is to so connect the brake band with the mounting bracket that a limited sliding movement towards and away from the brake drum will be permitted, said brake band being yieldably held out of engagement with the drum when released.

Another object of the invention is to so mount the brake band upon the bracket that movement of the band longitudinally of the vehicle axle will be prevented and the band thereby retained in proper relation to the drum for tightly gripping the same when contracted.

This invention is illustrated in the accompanying drawing, wherein

Figure 1 is a view showing a brake band applied to a drum and mounted through the medium of the improved bracket;

Fig. 2 is a sectional view taken on the line 2—2 of Fig. 1;

Fig. 3 is a view taken on the line 3—3 of Fig. 1 and showing the bracket and adjacent portions of the drum and brake band in elevation, and Fig. 4 is a perspective view of a portion of the brake band.

The brake drum 1 is of a conventional construction and will be secured to the wheel of an automobile or other vehicle in the usual manner. A brake drum is usually open at one side, as shown in Fig. 2, and this open side is closed by a dust guard 2 which is rigidly connected with the axle casing 3 in any desired manner. The brake band 4 fits about the drum and is provided with the usual lining 5 and adapted to be drawn into tight gripping engagement with the brake drum by a conventional operating means indicated in general by the numeral 6 when rotation of the wheel is to be stopped. After an automobile has been in use a certain length of time, the brake linings become worn and under present conditions it is necessary to remove the wheel in order to have access to the brake band and remove it so that it may be relined. This is objectionable as it requires a great deal of time and labor to remove the wheel and replace it and also there is danger of the wheel or other portions of the automobile being scratched while the wheel is being removed and replaced.

According to this invention, the brake band is mounted through the medium of a bracket 7 which includes an attaching plate 8 and a side arm 9. The attaching plate 8 is disposed parallel to the dust guard 2 and formed with bosses 10 which engage the outer face of the dust guard and hold the body portion of the plate in spaced relation thereto. Openings 11 are formed through the plate and bosses to receive studs 12 carried by the dust guard and an opening 13 is formed in the central portion of the plate to receive a bolt 14. The bolt 14 passes through an opening formed in the dust guard and is securely held in engagement therewith by a locking nut 15 and carries a nut 16 upon its threaded outer end portion which, when tightened, engages the outer face of the attaching plate 8 and securely holds the bracket in engagement with the dust guard. It will, therefore, be seen that the bracket is securely held to the dust guard through the medium of a single bolt and is prevented from having turning movement about the bolt by the studs 12. When it is desired to remove the bracket in order to reline the brake band, it is merely necessary to remove the nut 16 and the bracket will be released from the dust guard and together with the brake band can be moved out of operative relation to the brake drum.

The arm 9 extends across the peripheral face of the brake drum and has its free end portion provided with a longitudinally extending slit 17 which longitudinally intersects a threaded passage or socket 18 formed in the arm and adapted to receive the threaded shank of a bolt 19. A second threaded passage or socket 20 is formed in the arm 9 transversely of the socket 18 and is adapted to receive the threaded shank of a bolt 21 which projects from the arm at right angles to the bolt 19. A yoke 22 which is preferably formed of sheet metal and is U-shaped in end elevation, as shown in Fig.

4, is rigidly secured to the brake band by rivets or other fasteners 23 passed through its flanges or feet 24. This yoke straddles the arm 9 and has its bridge portion formed with an opening 25 to receive the shank of the bolt 19 and one side wall formed with a slot 26 to receive the shank of the bolt 21. By having the yoke engaged with the bolt 21, movement of the yoke and brake band longitudinally of the arm 9 is prevented and, therefore, the brake band cannot move longitudinally of this arm out of operative relation to the brake drum. A coiled spring 27 is disposed about the bolt 19 between the arm 9 and bridge portion of the yoke and normally retains the yoke and brake band in the position shown in Fig. 2 with the brake band held out of engagement with the brake drum. Therefore, the brake band will not have a tendency to engage with the brake drum when released and heating of the lining and unnecessary wear will be eliminated. When, however, the operating mechanism 6 is actuated to apply the brake and draw the band into tight gripping engagement with the drum, movement of the band and yoke longitudinally of the bolt 19 and relative to the arm 9 is permitted so that a good gripping action may take place. By adjusting the bolt 19, the tension of the spring 27 may be controlled and the brake band caused to be disposed the proper distance from the drum when the operating mechanism 6 is released. When it is necessary to reline the brake band, the nut 16 is removed and the mounting bracket together with the brake band will be released from the dust guard and can be readily removed so that the band can be relined and then easily and quickly replaced in operative relation to the brake drum.

Having thus described the invention, I claim:

In a structure of the character described, a brake drum, a dust guard at one side of said brake drum, a bracket including an attaching plate fitted against said dust guard and an arm extending across the peripheral face of said drum, means for securing said plate to said dust guard, a brake band disposed about said drum and extending between the drum and arm, a yoke carried by said band and straddling said arm, said arm being slit longitudinally from its free end and formed with a threaded socket bisected longitudinally by the slit and intermediate the said socket and its free end provided with a threaded socket bisected transversely by the slit, a bolt screwed into the first mentioned socket and provided with a head at its outer end, the yoke being slidable upon the bolt between said arm and the head of the bolt and having a side portion formed with a longitudinally extending slot, a bolt passed through the slot of said yoke and screwed into the second socket and adapted to draw the slit portion of the arm into tight binding engagement with the first mentioned bolt, and a spring coiled about the first mentioned bolt between the arm and yoke to yieldably resist movement of the yoke towards said drum.

In testimony whereof I affix my signature.

ROY A. KLINE. [L. S.]